United States Patent
Chen et al.

(10) Patent No.: US 8,502,512 B2
(45) Date of Patent: Aug. 6, 2013

(54) DC POWER CONVERTING CIRCUIT AND METHOD THEREOF

(75) Inventors: Lijing Chen, ShenZhen (CN); Zehong Qian, ShenZhen (CN)

(73) Assignee: MStar Semiconductor, Inc., Hsinchu Hsien (TW)

( * ) Notice: Subject to any disclaimer, the term of this patent is extended or adjusted under 35 U.S.C. 154(b) by 325 days.

(21) Appl. No.: 12/839,611

(22) Filed: Jul. 20, 2010

(65) Prior Publication Data
US 2011/0025290 A1    Feb. 3, 2011

(30) Foreign Application Priority Data
Jul. 31, 2009  (CN) .......................... 2009 1 0109197

(51) Int. Cl.
*G05F 1/00*   (2006.01)

(52) U.S. Cl.
USPC ........... 323/272; 323/222; 323/271; 323/282; 323/284; 323/285

(58) Field of Classification Search
USPC ................. 323/223, 266, 267, 269, 271, 272, 323/282, 284, 285
See application file for complete search history.

(56) References Cited

U.S. PATENT DOCUMENTS

| | | | | |
|---|---|---|---|---|
| 6,300,748 | B1* | 10/2001 | Miller | 323/266 |
| 2002/0093317 | A1* | 7/2002 | Matsuda et al. | 323/273 |
| 2004/0124820 | A1* | 7/2004 | Haas | 323/284 |
| 2009/0102449 | A1* | 4/2009 | Chang et al. | 323/311 |
| 2010/0026259 | A1* | 2/2010 | Ozaki et al. | 323/282 |

* cited by examiner

*Primary Examiner* — Nguyen Tran
(74) *Attorney, Agent, or Firm* — WPAT, PC; Justin King

(57) ABSTRACT

A direct current (DC) converting circuit includes a DC input end, for receiving a DC input voltage; a DC output end, for providing a predetermined DC voltage; a switch, coupled between the DC input end and the DC output end, for providing a direct path; a DC-DC step-down unit, coupled between the DC input end and the DC output end, for providing a step-down voltage path; and a control unit, coupled to the switch and the DC-DC step-down unit, for detecting the DC input voltage and selecting either the direct path or the step-down voltage path to provide the predetermined DC voltage at the DC output end. The DC power converting circuit can be applied in power supply circuits of multi-media players or TV setup boxes to convert DC input voltage including 5V, 9V or 12V DC voltages to a predetermined DC voltage.

14 Claims, 8 Drawing Sheets

DC POWER CONVERTING CIRCUIT AND METHOD THEREOF

CROSS REFERENCE TO RELATED PATENT APPLICATION

This patent application is based on China, P.R.C. patent application No. 200910109197.1 filed on Jul. 31, 2009.

FIELD OF THE INVENTION

The present invention relates to a power supply technology, and more particularly, to a direct current (DC) power converting circuit, compatible with 5V, 9V and 12 V power adapters, applied in electronic apparatuses, and an associated method.

BACKGROUND OF THE INVENTION

In an electronic apparatus using a DC voltage, a power adapter complying with a specified operating voltage is needed to provide the DC voltage. For example, when the operating voltage is 5V, a DC input voltage greater than 5V may damage components of the electronic apparatus. Therefore, it is important to have a correct power adapter for any electronic apparatus.

More specifically, there are various specifications for power adapters, e.g., 5V, 9V, and 12V power adapters. When a power output end of a 9V or 12V power adapter is plugged in a power input socket of an electronic apparatus having an operating voltage of 5V, components of the electronic apparatus may be damaged.

Therefore, a solution for allowing an electronic apparatus to use power supplies provided by power adapters of different specifications is needed.

SUMMARY OF THE INVENTION

An object of the present invention is to provide a DC power converting circuit compatible with power adapters of different specifications, so that the disadvantage associated with the prior art in that an electronic apparatus being compatible with only one type of power adapter is overcome.

A DC power converting circuit for generating a DC voltage is provided according to the present invention. The DC power converting circuit comprises a DC input end, for receiving a DC input voltage; a DC output end, for providing a predetermined DC voltage; a switch, coupled between the DC input end and the DC output end, for forming a direct path; a DC-DC step-down unit, coupled between the DC input end and the DC output end, for forming a step-down voltage path; and a control unit, coupled to the switch and the DC-DC step-down unit, for detecting the DC input voltage to select either the direct path or the step-down voltage path for providing the predetermined DC voltage to the DC output end.

A DC power converting method for generating a predetermined DC voltage is provided according to the present invention. The method comprises receiving a DC input voltage; detecting the DC input voltage; comparing the DC input voltage with a predetermined operating voltage range; adjusting the DC input voltage to the predetermined DC voltage for outputting when the DC input voltage exceeds the predetermined operating voltage range; or directly outputting the DC input voltage when the DC input voltage is within the predetermined operating voltage range.

The DC power converting circuit according to the present invention can be applied in power supply circuits of multimedia players or TV setup boxes to convert DC input voltages including 5V, 9V and 12V DC voltages to a predetermined DC voltage, so as to avoid damaging components of the electronic apparatuses when power adapters having output voltages higher than a desired operating voltage are used and to accordingly increase safety of using the electronic apparatuses. Therefore, users are given more options in choosing various types of power adapters for better flexibility.

The advantages and spirit related to the present invention can be further understood via the following detailed description and drawings.

DETAILED DESCRIPTION OF THE PREFERRED EMBODIMENT

Figure 1A:
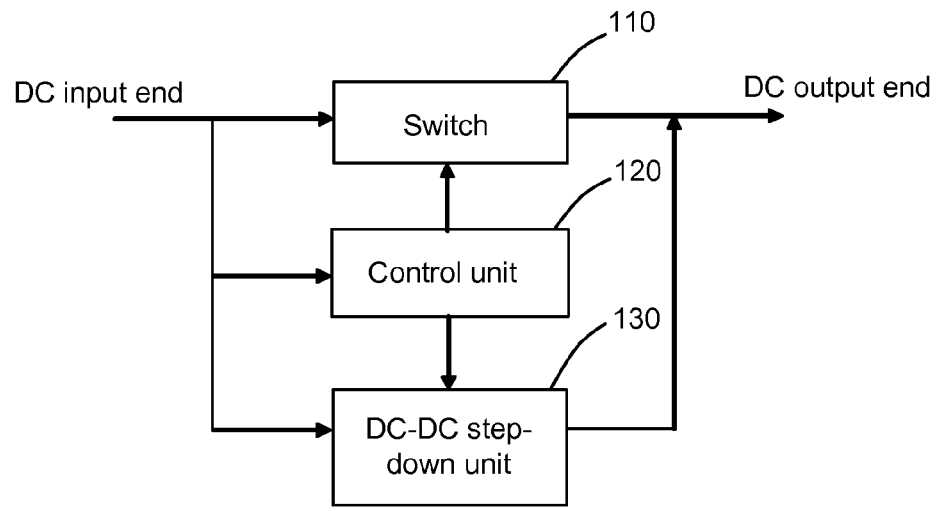
FIG. 1A is a block diagram of a DC power converting circuit in accordance with an embodiment of the present invention.

FIG. 1A is a block diagram of a DC power converting circuit in accordance with an embodiment of the present invention. The DC power converting circuit comprises a switch 110, a control unit 120, and a DC-DC step-down unit 130. The switch 110, coupled between a DC input end and a DC output end, is for forming a direct path. The DC-DC step-down unit 130, coupled between the DC input end and the DC output end, is for forming a step-down voltage path. The control unit 120 is respectively coupled to the 110 and the DC-DC step-down unit 130.

Figure 1B:
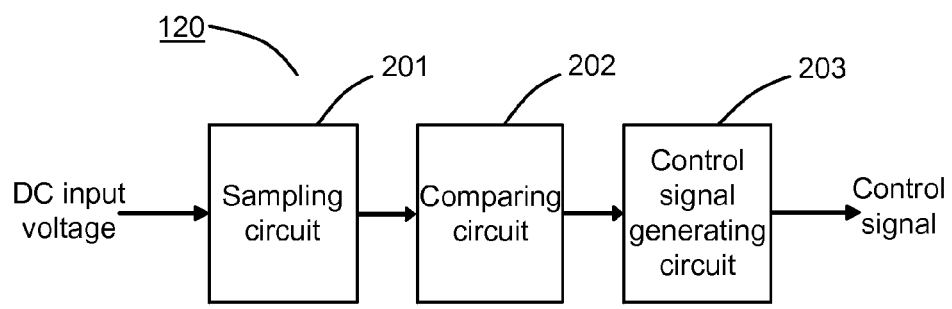
FIG. 1B is a block diagram of a control unit of the DC power converting circuit illustrated in FIG. 1A.

FIG. 1B is a block diagram of the control unit 120 of the DC power converting circuit illustrated in FIG. 1A. The control unit 120 comprises a sampling circuit 201, a comparing circuit 202, and a control signal generating circuit 203.

When the DC input voltage does not exceed a predetermined DC voltage threshold, the present invention outputs the received DC input voltage via the direct path when. When the DC input voltage exceeds the predetermined DC voltage threshold, the present invention routes the DC input voltage to the DC-DC step-down unit and then outputs the predetermined DC voltage.

The DC input voltage is inputted at the DC input end. The control unit detects the DC input voltage and controls operating statuses of the switch 110 and the DC-DC step-down unit 130, so as to select either of the direct path and the step-down voltage path to provide the predetermined DC voltage complying with an operating voltage of an electronic apparatus. In practice, the sampling circuit 201 samples the DC input voltage to generate a sampled signal to be transmitted to the comparing circuit 202. The comparing circuit 202 compares the sampled signal representing the DC input voltage with a reference voltage representing the operating voltage to generate a comparison result. After that, the control signal generating circuit 203 outputs a control signal according to the comparison result from the comparing circuit 202. When the DC input voltage is greater than an upper limit of a predetermined operating voltage range, the control signal triggers the switch 110 to open and enables the DC-DC step-down unit 130 to step down the DC input voltage to the predetermined DC voltage. When the DC input voltage lies within the predetermined operating voltage range, the control signal triggers the switch 110 to close and disables the DC-DC step-down unit 130 to directly provide the DC input voltage via the direct path.

Several embodiments of the present invention are described below.

Figure 2:
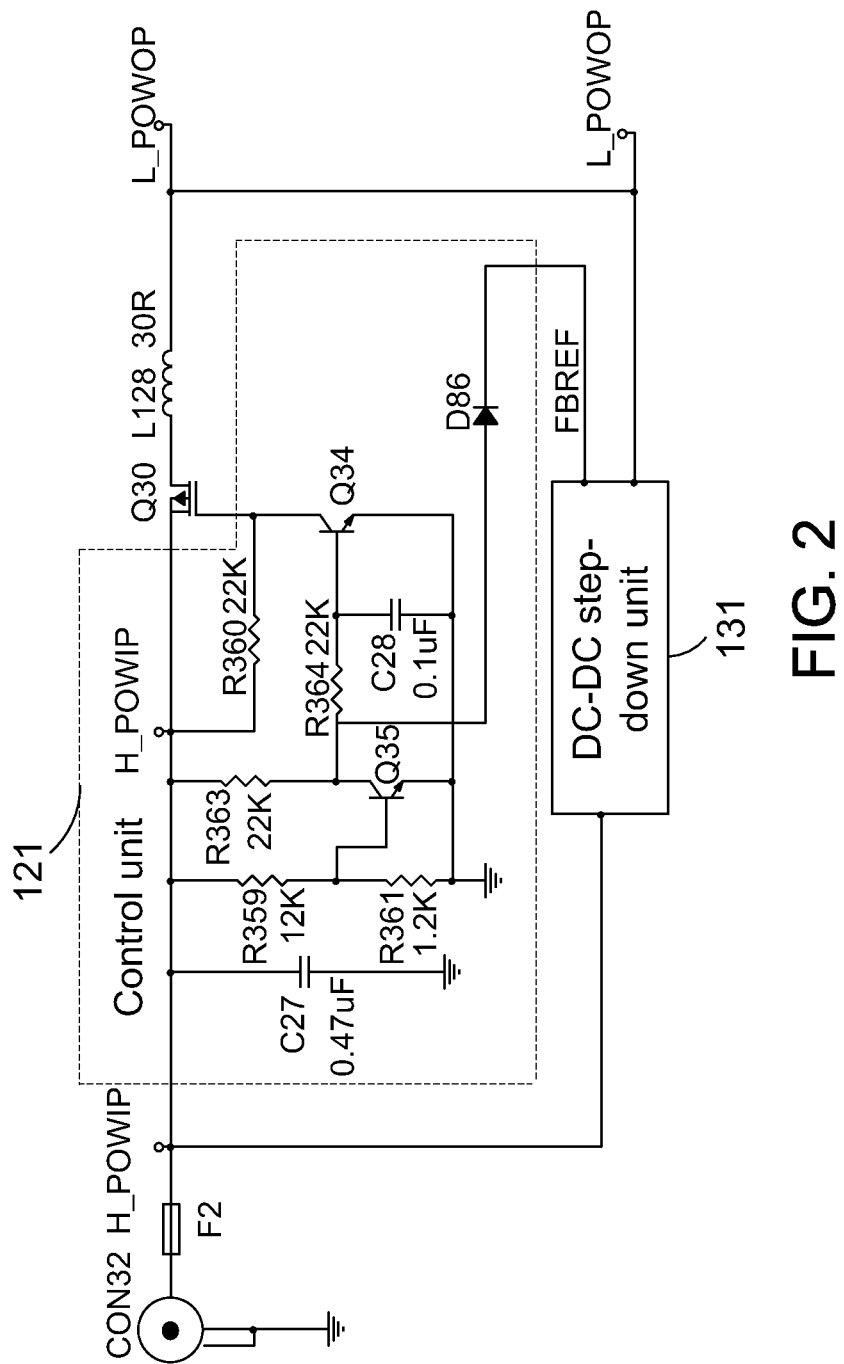
FIG. 2 is a schematic diagram of a DC power converting circuit in accordance with a first embodiment of the present invention.

FIG. 2 is a schematic diagram of a DC power converting circuit in accordance with a first embodiment of the present invention. A fuse F2 is coupled between a power input socket CON 32 and a DC input end H_POWIP. A direct path, comprising a transistor Q30 and an inductor L128, couples between the DC input end H_POWIP and a DC output end L_POWOP, and a step-down voltage path, comprising a DC-DC step-down unit 131 (enabled/disabled by logic level signals), is coupled between the DC input end H_POWIP and the DC output end L_POWOP as well. A dotted frame represents the control unit 121. A control signal FBREF controls operations of the DC-DC step-down unit 131, i.e., the control signal FBREF provides a logic level voltage to operate the DC-DC step-down unit 131.

In this embodiment, the sampling circuit 201 comprises resistors R359 and R361; the comparing circuit 202 comprises a resistor R363 and an negative-positive-negative (NPN) transistor Q35; the control signal generating circuit 203 comprises a resistor R360, a diode D86, a resistor R364, a capacitor C28 and an NPN transistor Q34; and the switch is realized by a field-effect transistor (FET) transistor Q30.

In this embodiment, suppose that a predetermined DC voltage 5V (e.g., complying with an operating voltage of an electronic apparatus) is outputted by the DC power converting circuit. Take DC input voltages of 5V, 9V and 12V for example. Operation statuses of main components of the DC power converting circuit and statuses of the control signal FBREF of the DC-DC step-down unit 131 are illustrated in Table 1.

TABLE 1

| Components/signal | DC input voltage | | |
| --- | --- | --- | --- |
| | 5 V | 9 V | 12 V |
| NPN transistor Q35 | off | on | on |
| NPN transistor Q34 | on | off | off |
| Diode D86 | on | off | off |
| FET Q30 | on | off | off |
| Control signal FBREF | High-level | Low-level | Low-level |
| DC-DC step-down unit131 | Disabled | Enabled | Enabled |

According to Table 1, when a 9V or 12V (or greater than 12V) adapter provides the DC input voltage, the FET Q30 is turned off, and the DC-DC step-down unit 131 is enabled; when a 5V (or smaller than 5V) adapter provides the DC input voltage, the FET Q30 is turned on, and the DC-DC step-down unit 131 is disabled. In this embodiment, the DC-DC step-down unit 131 is disabled when its control signal input pin receives a high-level signal, and the DC-DC step-down unit 131 is enabled when its control signal input pin receives a low-level signal or does not receive any signal; however, the DC-DC step-down unit 131 of the present invention is not limited to the foregoing description. In another embodiment of the present invention, the FET Q30 may be a P-channel enhancement mode FET AO3401.

When the DC input voltage is divided by the resistors R359 and R361, a sampled signal is generated on the resistor R361, and the NPN transistor Q35 compares its base-emitter threshold voltage (serving as the reference voltage) with a voltage of the sampled signal.

When the 9V or 12V (or greater than 12V) power adapter provides the DC input voltage, the voltage of the sampled signal is greater than the base-emitter threshold voltage of the transistor Q35, such that the transistor Q35 is turned on and a collector of the transistor Q35 outputs a low-level voltage. Accordingly, a base of the transistor Q34 receives the low-level voltage and thus the transistor Q34 is turned off to output a high-level voltage to a gate of the transistor Q30, such that the transistor Q30 is turned off and the direct path is open. In another aspect, the diode D86 receiving the low-level voltage outputted by the transistor Q35 is turned off and provides a low-level voltage to the DC-DC step-down unit 131 (i.e., the control signal FBREF provides a low-level voltage), such that the DC-DC step-down unit 131 is enabled and the step-down voltage path is closed.

When the 5V power adapter provides the DC input voltage, the voltage of the sampled signal is smaller than the threshold voltage of the transistor Q35, such that the transistor Q35 is turned off and the collector of the transistor Q35 provides a high-level voltage. Accordingly, the base of the transistor Q34 receives the high-level voltage outputted by the transistor Q35 and thus the transistor Q34 is turned on to output a low-level voltage to the gate of the transistor Q30, such that the transistor Q30 is turned on and the direct path is closed. In another aspect, the diode D86 receiving the high-level voltage outputted by the transistor Q35 is turned on and thus provides a high-level voltage to the DC-DC step-down unit 131 (i.e., the control signal FBREF provides a high level voltage), such that the DC-DC step-down unit 131 is disabled and the step-down voltage path is open.

In the foregoing embodiment, suppose that components of the DC power converting circuit are operated under an ideal condition. However, analog circuits may not be able to operate under such ideal condition. In the DC power converting circuit, the DC-DC step-down unit is only enabled when the DC input voltage is greater than $(5+\Delta)$V, where $\Delta$ may be different values depending on architectures of the DC power converting circuit. The operating voltage of the electronic apparatus in fact covers an operating voltage range, and the electronic apparatus works normally when the DC input voltage is within the operating voltage range, or the electronic apparatus does not work when the DC input voltage is lower than a lower limit of the operating voltage range. When the DC input voltage is greater than an upper limit of the operating voltage range, the DC input voltage needs to be stepped down to the operating voltage range of the electronic apparatus.

It is to be noted that, in this embodiment of the present invention, a DC output voltage of the DC converting voltage is designed as 5V for example; however, the DC output voltage of the present invention is not limited to 5V. For example, the DC converting voltage may output 3.3V, and at this point parameters of partial components of the DC power converting circuit need to be adjusted. Moreover, a power adapter for providing the DC input voltage is not limited to 5V, 9V, 12V or 3.3V, and power adapters of other specifications are also satisfactory. For example, when a 24V power adapter is used for providing the DC input voltage, the DC-DC step-down unit is designed as being capable of stepping down a 24V DC to a 5V or 3.3V DC. In addition, in the DC power converting circuit, the parameters of the components are adjusted to ensure that the voltage of the sampled signal represents the DC input voltage and the reference voltage represents the operating voltage of the electronic apparatus.

Figure 3:
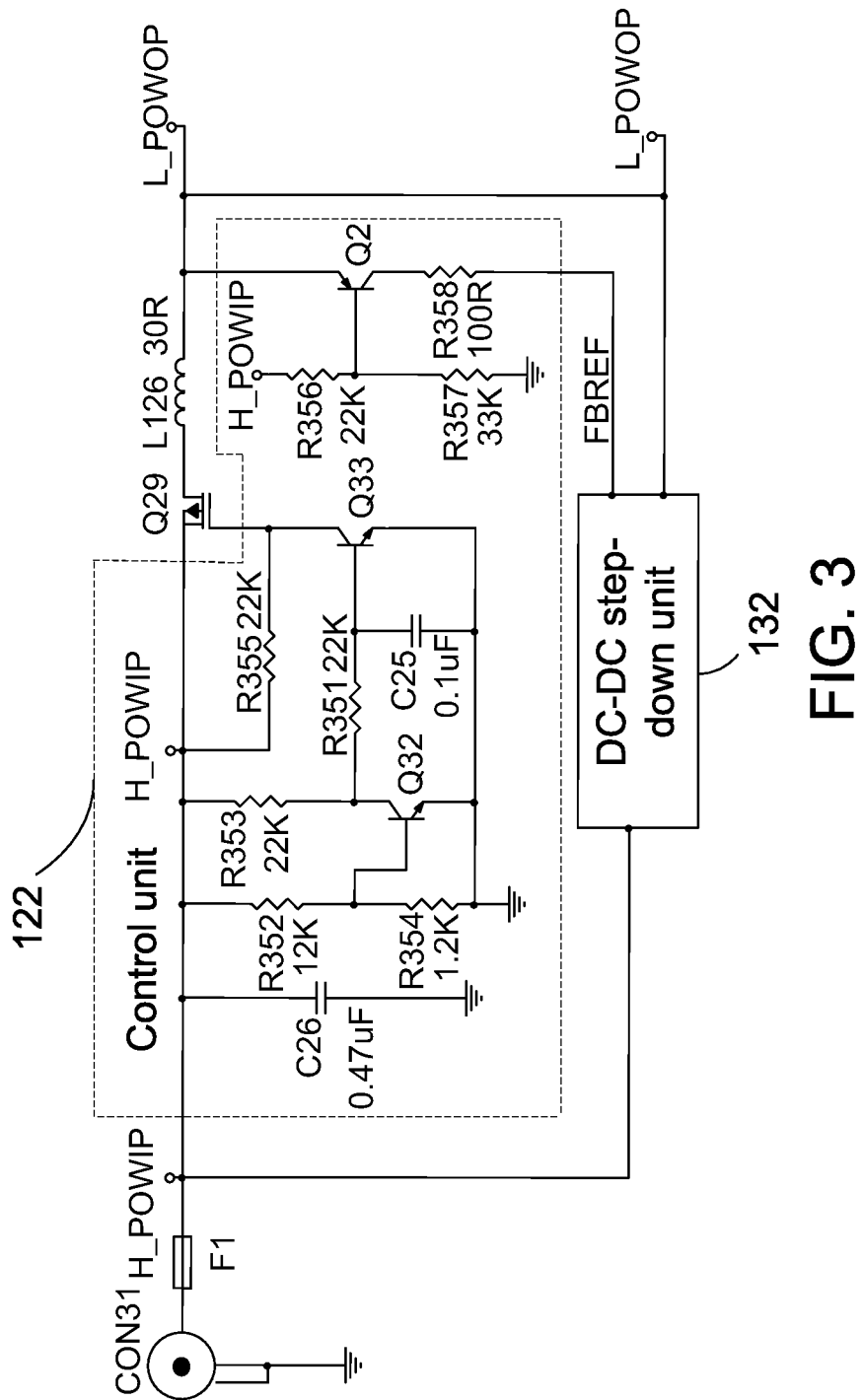
FIG. 3 is a schematic diagram of a DC power converting circuit in accordance with a second embodiment of the present invention.

FIG. 3 is a schematic diagram of a DC power converting circuit in accordance with a second embodiment of the present invention. A fuse F1 is coupled between a power input socket CON 31 and a DC input end H_POWIP. A direct path, comprising a transistor Q29 and an inductor L126, couples between the DC input end H_POWIP and a DC output end L_POWOP, and a step-down voltage path, comprising a DC-DC step-down unit 132 (enabled/disabled by logic level signals), couples between the DC input end H_POWIP and the DC output end L_POWOP as well. A dotted frame represents the control unit 122. A control signal FBREF controls operations of the DC-DC step-down unit 132, i.e., the control signal FBREF provides a logic level voltage to operate the DC-DC step-down unit 132. A switch is realized by a FET Q29.

Different from the first embodiment illustrated in FIG. 2, a PNP transistor Q2 in the second embodiment illustrated in FIG. 2 replaces the diode D86 illustrated in FIG. 2 to provide the control signal FBREF.

In this embodiment, a first sampling circuit comprises a first resistor R352 and a second resistor R354, and a second sampling circuit comprises a third resistor R356 and a fourth resistor R357. A first comparing circuit comprises a fifth resistor 353 and a first NPN transistor Q32, and a second comparing circuit comprises a PNP transistor Q2. A first control signal generating circuit, comprising a sixth resistor R355, a seventh resistor R351, a first capacitor C25 and a second NPN transistor Q33, controls operations of the FET Q29. A second control signal generating circuit, comprising the PNP transistor Q2 and an eighth resistor R358, controls operations of the DC-DC step-down unit 132.

The FET Q29 has a source coupled to the DC input end H_POWIP, and a drain coupled to the DC output end L_POWOP via the inductor L126. The DC-DC step-down unit 132 has an input end coupled to the DC input end H_POWIP, and an output end coupled to the DC output end L_POWOP. The first resistor R352 and the second resistor R354 are coupled in series between the DC input end H_POWIP and ground. The third resistor R356 and the fourth resistor R357 are coupled in series between the DC input end H_POWIP and ground. The first NPN transistor Q32 has its base coupled between the first resistor R352 and the second resistor R354, its collector coupled to the DC input end H_POWIP via the fifth resistor R353, and its emitter coupled to the ground. The second NPN transistor Q33 has its base coupled to the collector of the first NPN transistor Q32 via the seventh resistor R351 and coupled to ground via the first capacitor C25, its emitter coupled to ground, and its collector coupled to a gate of the FET Q29 and coupled to the DC input end H_POWIP via the sixth resistor R355. The PNP transistor Q2 has its base coupled between the third resistor R356 and the fourth resistor R357, its emitter coupled to the DC output end L_POWOP, and its collector coupled to the DC-DC step-down unit 132 via the eighth resistor R358 to enable or disable a control signal input pin.

In this embodiment, suppose that a predetermined DC voltage 5V (e.g., complying with an operating voltage of an electronic apparatus) is outputted by the DC power converting circuit. Take DC input voltages of 5V, 9V and 12V for example. Operation statuses of main components of the DC power converting circuit and statuses of the control signal FBREF of the DC-DC step-down unit 132 are illustrated in Table 2.

TABLE 2

| Components/signal | DC input voltage | | |
| --- | --- | --- | --- |
|  | 5 V | 9 V | 12 V |
| NPN transistor Q32 | off | on | on |
| NPN transistor Q33 | on | off | off |
| PNP transistor Q2 | on | off | off |
| FET Q29 | on | off | off |
| Control signal FBREF | High-level | Low-level | Low-level |
| DC-DC step-down unit 132 | Disabled | Enabled | Enabled |

According to Table 2, when a 9V or 12V (or greater than 12V) adapter provides the DC input voltage, the FET Q29 is turned off, and the DC-DC step-down unit 132 is enabled; when a 5V (or smaller than 5V) adapter provides the DC input voltage, the FET Q29 is turned on, and the DC-DC step-down unit 132 is disabled. In this embodiment, the DC-DC step-down unit 132 is disabled when its control signal input pin receives a high-level signal, and the DC-DC step-down unit 131 is enabled when its control signal input pin receives a low-level signal or does not receive any signal; however, the DC-DC step-down unit 132 of the present invention is not limited to the foregoing description. In another embodiment of the present invention, the FET Q29 is realized by a P-channel enhancement mode FET AO3401.

When the DC input voltage is divided by the resistor R352 and the resistor R354, a first sampled signal is generated at the resistor R354, and the NPN transistor Q32 compares its base-emitter threshold voltage (serving as the reference voltage) with a voltage of the first sampled signal. At this point, the DC input voltage is divided by the resistor R356 and the resistor R357 to generate a second sampled signal at the resistor R357, and the PNP transistor Q2 compares its base-emitter threshold voltage (serving as the reference voltage) with a voltage of the second sampled signal.

When the 9V or 12V (or greater than 12V) power adapter provides the DC input voltage, in one aspect, the voltage of the first sampled signal is greater than the base-emitter threshold voltage of the transistor Q32, and thus the transistor Q32 is turned on to output a low-level voltage at its collector, such that the base of transistor Q33 receives the low-level voltage and thus is turned off. Therefore, the transistor Q33 outputs a high-level voltage to the gate of the transistor Q29, such that the transistor Q29 is turned off and the direct path is open. In another aspect, the voltage of the second sampled signal greater than or close to a voltage of the collector of the transistor Q2 is not able to achieve the base-emitter threshold voltage of the transistor Q2, such that the transistor Q2 is turned off and provides a low-level voltage to be received by the DC-DC step-down unit 132 (i.e., the control signal FBREF provides a low-level voltage), such that the DC-DC step-down unit 132 is enabled and the step-down voltage path is closed.

When the 5V power adapter provides the DC input voltage, in one aspect, the voltage of the first sampled signal is lower than the base-emitter threshold voltage and thus the transistor Q2 is turned off to output a high-level voltage at its collector, such that the base of the transistor Q33 receives the high-level voltage and is turned on to output a low-level voltage at the gate of the transistor Q29. Therefore, the transistor Q29 is turned on, and the direct path is closed. In another aspect, the second sampled signal lower than the voltage of the collector of the transistor Q2 is able to achieve the threshold voltage, such that the transistor Q2 is turned on to output a high-level voltage to be received by The DC-DC step-down unit 132 (i.e., the control signal FBREF of the DC-DC step-down unit 132 provides a high level voltage), such that the DC-DC step-down unit 132 is disabled and the step-down voltage path is open.

In this embodiment, by adjusting resistance ratios between the resistors R352 and R354, and the resistors R356 and R357, input power compatibility ranges can be accordingly adjusted. For example, when the DC power converting circuit needs to be compatible with a power adapter for outputting at least a 13V DC, a predetermined output voltage of the DC-DC step-down unit 132 is adjusted. In addition, models of the transistors and fuse are also changed to alter a rated current of the DC power converting circuit. For example, the maximum rated current in this embodiment is 4 A.

Figure 4:
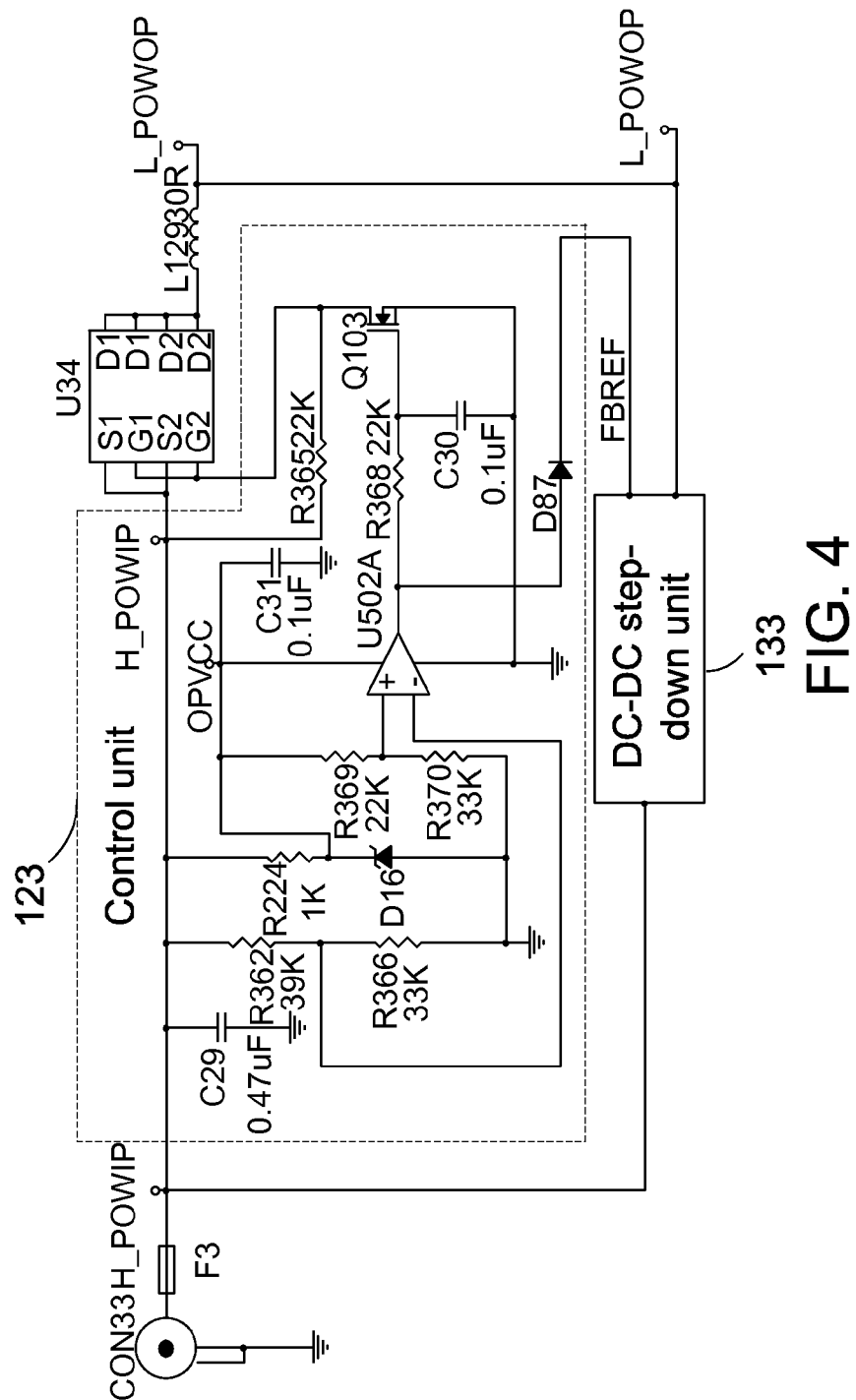
FIG. 4 is a schematic diagram of a DC power converting circuit in accordance with a third embodiment of the present invention.

FIG. 4 is schematic diagram of a DC power converting circuit in accordance with a third embodiment of the present invention. A fuse F3 is coupled between a power input socket CON 33 and a DC input end H_POWIP. A direct path, comprising an integrated switch U34 and an inductor L129, couples between the DC input end H_POWIP and a DC output end L_POWOP, and a step-down voltage path, comprising a DC-DC step-down unit 133 (enabled/disabled by logic level signals), couples between the DC input end H_POWIP and the DC output end L_POWOP as well. A dotted frame represents the control unit 123. A control signal FBREF controls operations of the DC-DC step-down unit 133, i.e., the control signal FBREF provides a logic level voltage to operate the DC-DC step-down unit 133.

In this embodiment, a sampling circuit comprises resistors R362 and R366. A comparing circuit comprises resistors R224, R369, and R370, a Zener diode D16 and a differential amplifier U502A (e.g. TL062). A signal generating circuit comprises a diode D87, resistors R368 and R365, a capacitor C30 and a FET Q103. The integrated switch U34 (e.g., a dual P-channel enhancement mode FET AO4803A) is a switch, and the FET Q103 is an N-channel FET.

In this embodiment, suppose that a predetermined DC voltage 5V (e.g., complying with an operating voltage of an electronic apparatus) is outputted by the DC power converting circuit. Take DC input voltages of 5V, 9V and 12V for example. Operation statuses of main components of the DC power converting circuit and statuses of the control signal FBREF of the DC-DC step-down unit 133 are illustrated in Table 3.

TABLE 3

| Components/signal | DC input voltage | | |
|---|---|---|---|
| | 5 V | 9 V | 12 V |
| Differential amplifier U502A | High-level | Low-level | Low-level |
| FET Q103 | on | off | off |
| Integrated switch U34 | on | off | off |
| Diode D87 | on | off | off |
| Control signal FBREF | High-level | Low-level | Low-level |
| DC-DC step-down unit 133 | Disabled | Enabled | Enabled |

According to Table 3, when a 9V or 12V (or greater than 12V) power adapter provides the DC input voltage, the integrated switch U34 is turned off, and the DC-DC step-down unit 133 is enabled; when a 5V (or smaller than 5V) power adapter provides the DC input voltage, the integrated switch U34 is turned on, and the DC-DC step-down unit 133 is disabled. In this embodiment, the DC-DC step-down unit 133 is disabled when its control signal input pin receives a high-level signal, and the DC-DC step-down unit 133 is enabled when its control signal input pin receives a low-level signal or does not receive any signal; however, the DC-DC step-down unit 133 of the present invention is not limited to the foregoing description.

When the DC input voltage is divided by the resistors R362 and R366, a sampled signal is generated at the resistor R366 and is transmitted to a negative input end of the differential amplifier U502A. An output voltage of the Zener diode D16 is divided by the resistors R369 and R370 to output a reference voltage at the resistor R370, and the reference voltage is transmitted to a positive input end of the differential amplifier U502A. The different amplifier U502A compares a voltage of the sampled signal and the reference voltage and to output a signal having a high or low level voltage according to the comparison result.

When the 9V or 12V (or greater than 12V) power adapter provides the DC input voltage, the voltage of the sampled signal is greater than the reference voltage and the differential amplifier U502A outputs a low-level voltage. Accordingly, in one aspect, a gate of the FET Q103 receives the low-level voltage and thus the FET Q103 is turned off and the integrated switch U34 is turned off, such that the direct path is open; in another aspect, the diode D87 is turned off to output a low-level voltage to be received by the DC-DC step-down unit 133 (i.e., the control signal FBREF has a low-level voltage), such that the DC-DC step-down unit 133 is enabled and the step-down voltage path is closed.

When the 5V power adapter provides the DC input voltage, the voltage of the sampled signal is lower than the reference voltage, such that the differential amplifier U502A outputs a high-level voltage. Accordingly, in one aspect, the gate of the FET Q103 receives the high-level voltage and is turned on, such that the integrated switch U34 is turned on and the direct path is closed; in another aspect, the diode D87 is turned on to output a high-level voltage to be received by the DC-DC step-down unit 133 (i.e., the control signal FBREF has a high level voltage), such that the DC-DC step-down unit 133 is disabled and the step-down voltage path is open.

It is to be noted that, the N-channel FET Q103 has a same function as an NPN transistor, e.g., the NPN transistor Q34. The integrated switch U34 implements the AO4803A. Compared to the FET Q30 (P-channel FET) illustrated in FIG. 2, the integrated switch U34 effectively reduces a voltage drop and thus is more suitable for an electronic apparatus that requires more accurate voltages.

Figure 5:
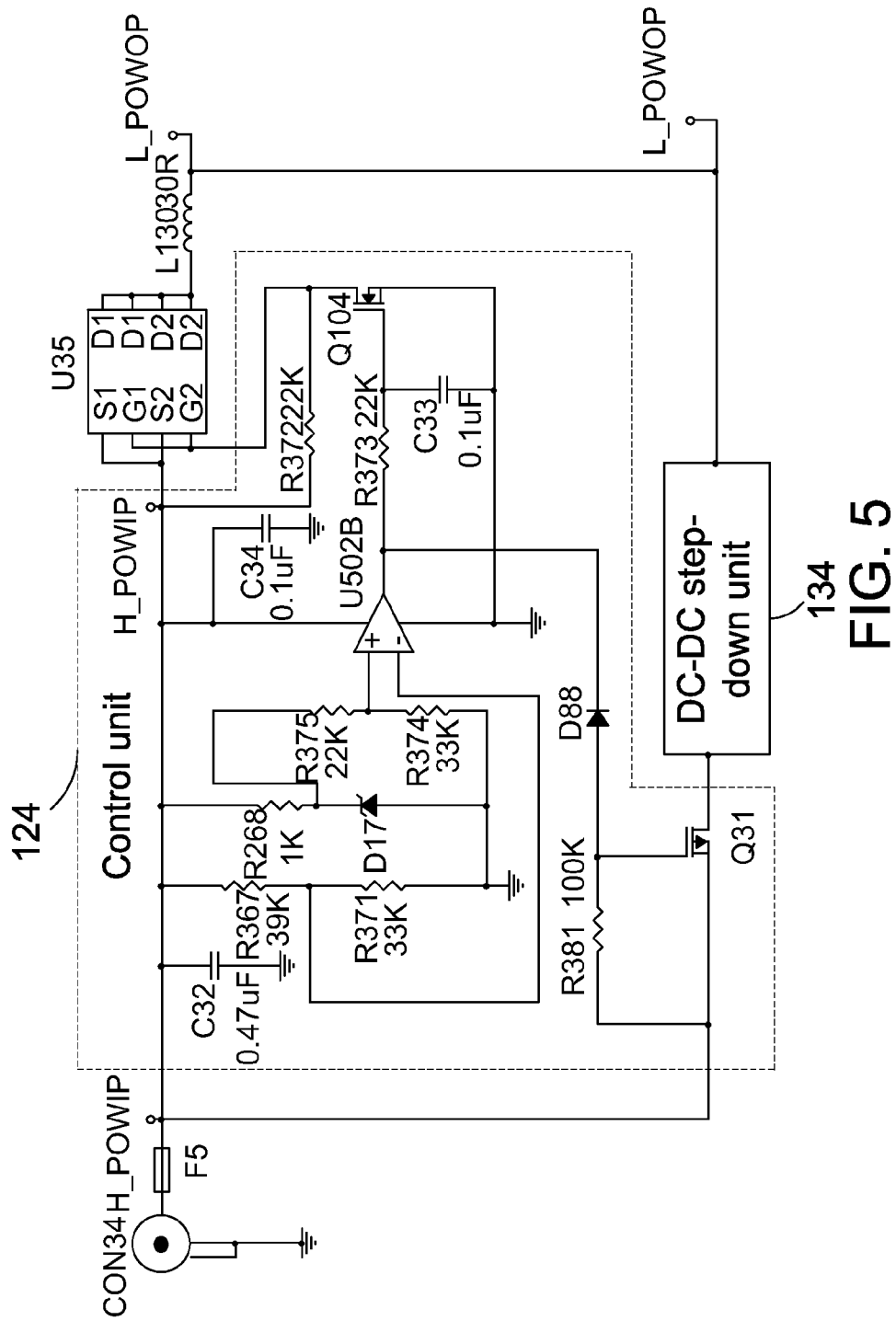
FIG. 5 is a schematic diagram of a DC power converting circuit in accordance with a fourth embodiment of the present invention.

FIG. 5 is schematic diagram of a DC power converting circuit in accordance with a fourth embodiment of the present invention. A fuse F5 is coupled between a power input socket CON 34 and a DC input end H_POWIP. A direct path, comprising an integrated switch U35 and an inductor L130, couples between the DC input end H_POWIP and a DC output end L_POWOP, and a step-down voltage path, comprising a DC-DC step-down unit 134 (enabled/disabled by logic level signals), couples between the DC input end H_POWIP and the DC output end L_POWOP as well. A dotted frame represents the control unit 124.

In this embodiment, a sampling circuit comprises resistors R367 and R371. A comparing circuit comprises resistors R268, R375 and R374, a Zener diode D17 and a differential amplifier U502B. A signal generating circuit comprises a diode D88, a FET Q31, resistors R381, R373 and R372, a capacitor C33 and a FET Q104. The integrated switch U35

(e.g., dual P-channel enhancement mode FET AO4803A) is a switch unit, the FET Q104 is an N-channel FET, and the FET Q31 is P-channel FET such as the AO3401.

In this embodiment, suppose that a predetermined DC voltage 5V (e.g., complying with an operating voltage of an electronic apparatus) is outputted by the DC power converting circuit. Take DC input voltages of 5V, 9V and 12V for example. Operating statuses of main components of the DC power converting circuit are illustrated in Table 4.

TABLE 4

| Components/signal | DC input voltage | | |
|---|---|---|---|
| | 5 V | 9 V | 12 V |
| Differential amplifier U502B | High-level | Low-level | Low-level |
| FET Q104 | on | off | off |
| Integrated switch U35 | on | off | off |
| Diode D88 | on | on | on |
| FET Q31 | off | on | on |
| DC-DC step-down unit134 | Disabled | Enabled | Enabled |

According to Table 4, when a 9V or 12V (or greater than 12V) power adapter provides the DC input voltage, the integrated switch U35 is turned off, and the DC-DC step-down unit 134 is enabled; when a 5V (or smaller than 5V) power adapter provides the DC input voltage, the integrated switch U35 is turned on, and the DC-DC step-down unit 134 is disabled. In this embodiment, the DC-DC step-down unit 134 is disabled when its control signal input pin receives a high-level signal, and the DC-DC step-down unit 134 is enabled when its control signal input pin receives a low-level signal or does not receive any signal; however, the DC-DC step-down unit 134 of the present invention is not limited to the foregoing description.

When the DC input voltage is divided by the resistors R367 and R371, a sampled signal is generated at the resistor R371 and is transmitted to a negative input end of the differential amplifier U502B. An output voltage of the Zener diode D17 is divided by the resistors R375 and R374 to output a reference voltage at the resistor R374, and the reference voltage is transmitted to a positive input end of the differential amplifier U502B. The different amplifier U502B compares a voltage of the sampled signal with the reference voltage to output a signal having a high or low level voltage according to the comparison result.

When the 9V or 12V (or greater than 12V) power adapter provides the DC input voltage, the voltage of the sampled signal is greater than the reference voltage and the differential amplifier U502B outputs a low-level voltage. Accordingly, in one aspect, a gate of the FET Q104 receives the low-level voltage and thus the FET Q104 is turned off and the integrated switch U35 is turned off, such that the direct path is open; in another aspect, the FET Q31 is turned on, such that the DC-DC step-down unit 133 is connected to the DC input end H_POWIP and is enabled, i.e., the step-down voltage path is closed.

When the 5V power adapter provides the DC input voltage, the voltage of the sampled signal is lower than the reference voltage, such that the differential amplifier U502B outputs a high-level voltage. Accordingly, in one aspect, the gate of the FET Q104 receives the high-level voltage and is turned on, such that the integrated switch U35 is turned on and the direct path is closed; in another aspect, the direct path between the DC-DC step-down unit 134 and the DC input end H_POWIP is open, such that the DC-DC step-down unit 133 is disabled and the step-down voltage path is open.

Referring to FIG. 5, a power-off approach for disabling the DC-DC step-down unit 134 is that a control signal outputted by the differential amplifier U502B (e.g., TL062) is used for turning off the FET Q31 (e.g., the AO3401) to cut off power supply of the DC-DC step-down unit 134.

In order to meet requirements that the gate of the FET Q31 has on the level of the voltage, the diode D88 is used for stepping up a voltage outputted by the differential amplifier U502B. Accordingly, the diode D88 is turned on regardless of whether a low-level or high-level voltage is outputted from the differential amplifier U502B to the negative end of the diode D88, and the voltage outputted by the differential amplifier U502B is stepped up by a PN junction voltage and is outputted to the gate of the FET Q31. When the DC input voltage is 5V, the voltage of the gate of the FET Q31 is a high-level voltage, the FET Q31 is turned off and the DC-DC step-down unit 134 is disabled; when the DC input voltage is 9V or 12V, the voltage of the gate of the FET Q31 is a low-level voltage, the FET Q31 is turned on and the DC-DC step-down unit 134 is enabled.

Figure 6:
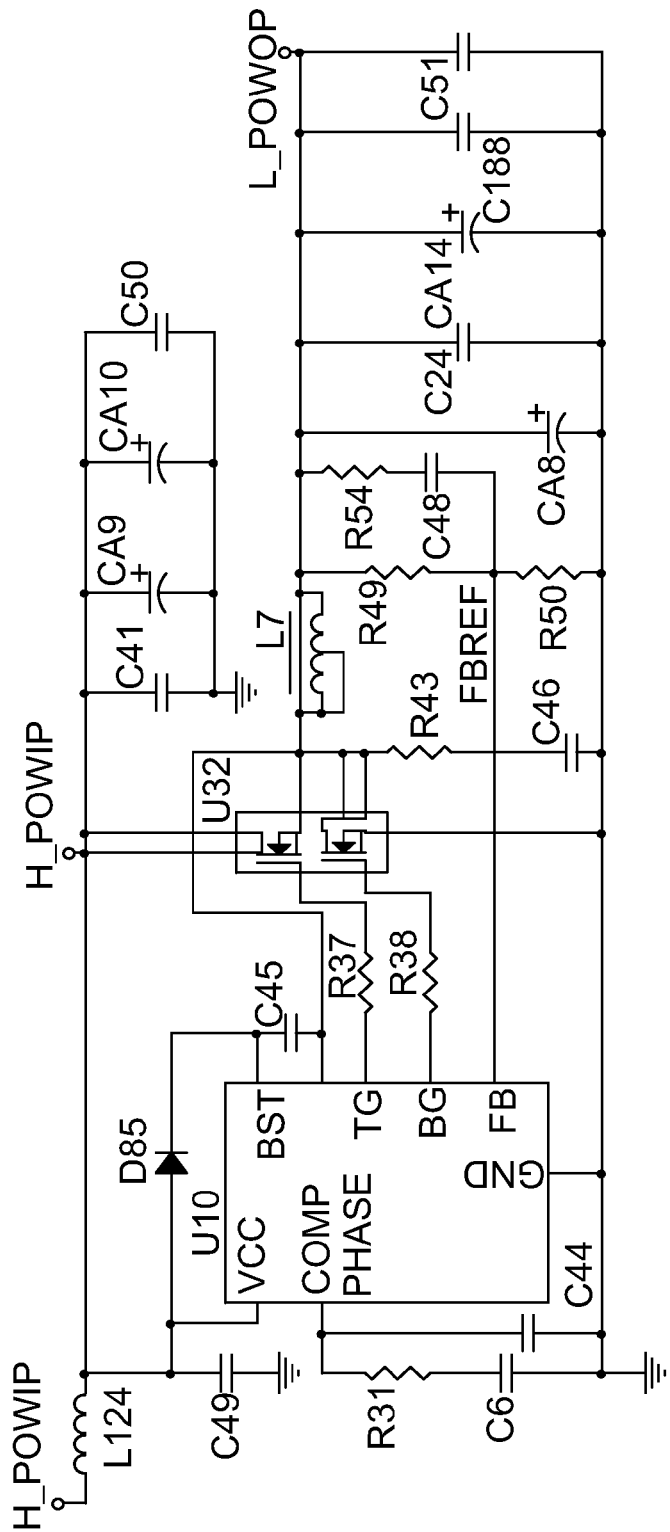
FIG. 6 is a schematic diagram of a DC-DC step-down unit of a DC power converting circuit in accordance with an embodiment of the present invention.
Figure 7:
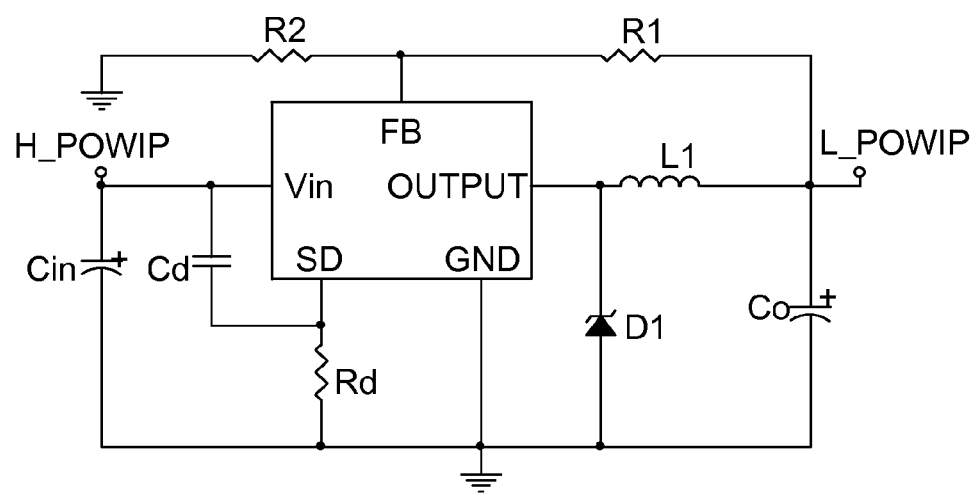
FIG. 7 is a schematic diagram of a DC-DC step-down unit of a DC power converting circuit in accordance with another embodiment of the present invention.

In a DC power converting circuit according to the present invention, a DC-DC step-down unit has many solutions, e.g., the applications illustrated in FIG. 6 or FIG. 7; however, the DC-DC step-down unit according to the present invention is not limited to the following examples.

FIG. 6 is a schematic diagram of a DC-DC step-down unit of a DC power converting circuit in accordance with an embodiment of the present invention. In this embodiment, the DC-DC step-down unit, realized by NCP1587, has a maximum input voltage of 13.5V and has an output current greater than 5 A/5V.

FIG. 7 is a schematic diagram of a DC-DC step-down unit of a DC power converting circuit in accordance with another embodiment of the present invention. In this embodiment, the DC-DC step-down unit, realized by AP1501 of DIODES Company, is compatible with an 18V or 24V power adapter.

Figure 8:
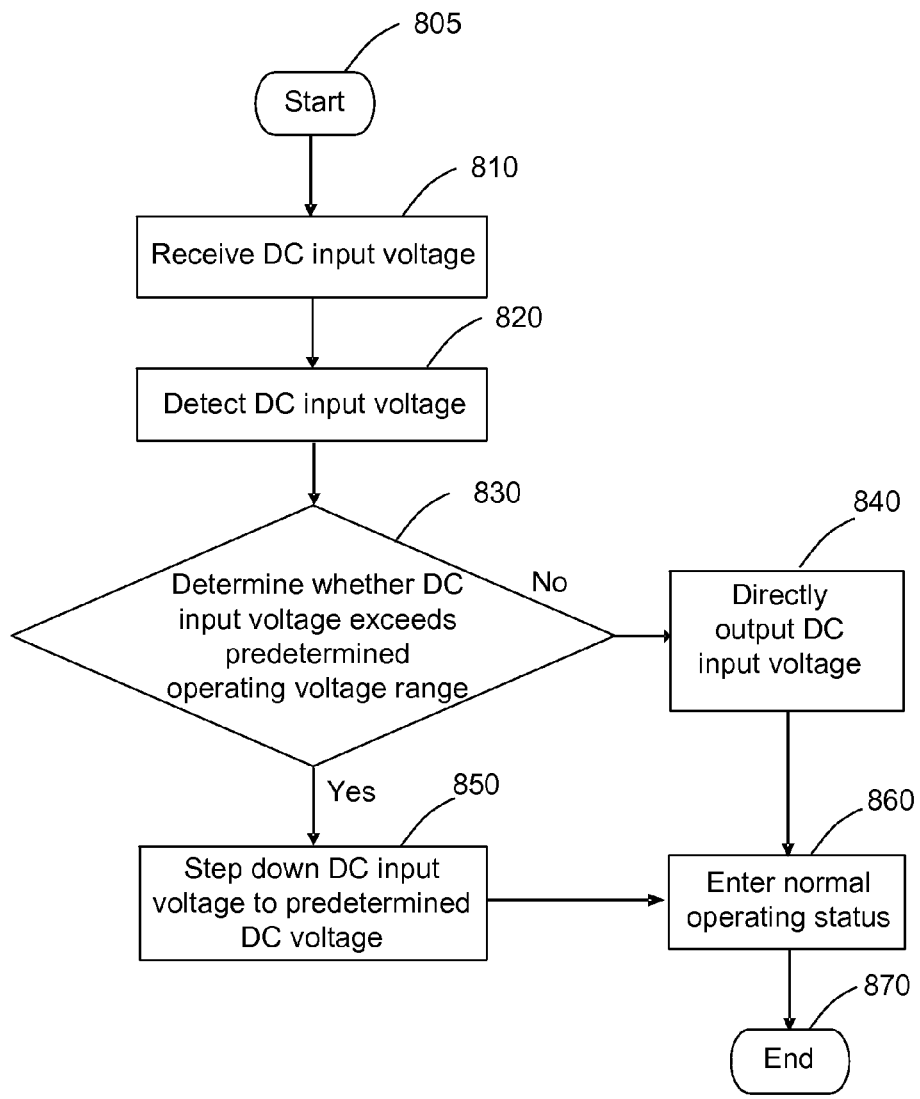
FIG. 8 is a flow chart of a DC power converting method in accordance with an embodiment of the present invention.

FIG. 8 is a flow chart of a DC power converting method in accordance with an embodiment of the present invention. The method is for providing a predetermined DC voltage. The flow begins with Step 805. For example, in Step 805, an electronic apparatus is activated. In Step 810, a DC input voltage is received. In Step 820, the DC input voltage is detected. In Step 830, it is determined whether the DC input voltage exceeds a predetermined operating voltage range. When the DC input voltage exceeds the predetermined operating voltage range, Step 850 is performed to step down the DC input voltage to the predetermined DC voltage for outputting; when the DC input voltage is within the predetermined operating voltage range, Step 840 is performed to directly output the DC input voltage. In Step 860, the electronic apparatus enters a normal operating status. The flow ends with Step 870.

For example, when the DC input voltage is 12V, 9V or 5V, the predetermined DC voltage is 5V.

According to the foregoing four embodiments according to the present invention, the step of detecting the DC input voltage (Step 820) is to divide the DC input voltage to generate a sampled signal.

The step of determining whether the DC input voltage exceeds the predetermined operating voltage range (Step 830) further comprises comparing the sampled signal with a reference voltage to generate a comparison result, and generating a first control signal and a second control signal according to the comparison result. When the first control signal enables outputting the DC input voltage directly, the second control signal disables performing a DC-DC stepping down;

when the first control signal disables outputting the DC input voltage directly, the second control signal enables performing the DC-DC stepping down.

A DC power converting circuit according to the present invention is applied in electronic apparatuses, e.g., multimedia players, TV setup boxes, or routers, which use AC-to-DC power adapters, so that the electronic apparatuses become compatible with different 5V, 9V or 12V power adapters of different specifications.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A direct current (DC) power converting circuit, for generating a predetermined DC voltage, comprising:
    a DC input end, for receiving a DC input voltage;
    a DC output end, for providing the predetermined DC voltage;
    a switch, coupled between the DC input end and the DC output end, for providing a direct path, wherein the switch is an FET having a source coupled to the DC input end and a drain coupled to the DC output end via an inductor;
    a DC-DC step-down unit, coupled between the DC input end and the DC output end, for providing a step-down voltage path, wherein the DC-DC step-down unit is a DC-DC step-down integrated circuit controlled by a logic level voltage and the DC-DC step-down circuit has a DC-DC step-down circuit input end coupled to the DC input end and a DC-DC step-down circuit output end coupled to the DC output end; and
    a control unit, coupled to the switch and the DC-DC step-down unit, for detecting the DC input voltage to select either the direct path or the step-down voltage path in order to providing the predetermined DC voltage to the DC output end, wherein the control unit comprises:
    a sampling circuit, coupled to the DC input end, for obtaining a sampled signal of the DC input voltage, wherein the sampling circuit comprises:
        a first sampling circuit comprising a first resistor and a second resistor; and
        a second sampling circuit comprising a third resistor and a fourth resistor;
        wherein the first resistor and the second resistor are coupled in series between the DC input end and round and the third resistor and the fourth resistor are coupled in series between the DC output end and ground;
    a comparing circuit, coupled to the sampling circuit, for receiving the sampled signal and comparing the sampled signal with a reference voltage to generate a comparison result, wherein the comparing circuit comprises:
        a first comparing circuit comprising a fifth resistor and a first NPN transistor; and
        a second comparing circuit comprising a PNP transistor;
        wherein the first NPN transistor has a first base, a first collector, and a first emitter, the first base is coupled between the first resistor and the second resistor, the first collector is coupled to the DC input end via the fifth resistor, and the first emitter is coupled to ground;
    a control signal generating circuit, coupled to the comparing circuit, for generating a control signal for controlling the switch and the DC-DC step-down unit simultaneously, wherein the control signal generating circuit comprises:
        a first control signal generating circuit comprising a sixth resistor a seventh resistor, a first capacitor and a second NPN transistor; and
        a second control signal generating circuit comprising the PNP transistor and an eighth resistor;
        wherein the second NPN transistor has a second base, a second collector, and a second emitter, the second base is coupled to the first collector of the first NPN transistor via the fifth resistor and is also coupled to ground via the first capacitor, the second emitter is coupled to ground, and the second collector is coupled to the gate of the FET and is also coupled to the DC input end via the sixth resistor;
        wherein the PNP transistor has a third base, a third collector, and a third emitter, the third base is coupled between the third resistor and the fourth resistor, the third emitter is coupled to the DC output end, the third collector is coupled to a control signal input pin of the DC-DC step-down unit via the eighth resistor;
    wherein when DC input voltage is greater than an upper limit of a predetermined operating voltage range, the control unit triggers the switch to open and enable the DC-DC step-down unit to select the step-down voltage path, and when the DC input voltage is within the predetermined operating voltage range, the control unit triggers the switch to close and disables the DC-DC step-down unit to select the direct path.

2. The DC power converting circuit as claimed in claim 1, wherein the first resistor and the second resistor in the first sampling circuit divide the DC input voltage to generate a first sampled signal and a threshold voltage of the first NPN transistor serves as a first reference voltage for comparison with the first sampled signal.

3. The DC power converting circuit as claimed in claim 1, wherein the first control signal generating circuit and the second control signal generating circuit respectively generate a first control signal and a second control signal according to the comparison result from the comparing circuit, to respectively control the switch and the DC-DC step-down unit, such that when the first control signal triggers the switch unit to close, the second control signal disables the DC-DC step-down unit, and when the first control signal triggers the switch unit to open, the second control signal enables the DC-DC step-down unit.

4. The DC power converting circuit as claimed in claim 3, wherein the second NPN transistor in the first control signal generating circuit is coupled between the comparing circuit and the switch unit, for generating the first control signal according to the comparison result to control the switch unit.

5. The DC power converting circuit as claimed in claim 3, wherein the PNP transistor in the second control signal generating circuit generates the second control signal according to the comparison result to control a power supply or a logic level voltage of the DC-DC step-down unit.

6. The DC power converting circuit as claimed in claim 3, wherein an FET is coupled to the PNP transistor in the second control signal generating circuit, for generating the second control signal according to the comparison result to control a power supply or a logic level voltage of the DC-DC step-down unit.

7. The DC power converting circuit as claimed in claim 1, wherein the DC input end is coupled to a fuse to provide over-current protection to the DC power converting circuit.

8. The DC power converting circuit as claimed in claim 7, wherein a second capacitor is coupled between the DC input end and ground.

9. The DC power converting circuit as claimed in claim 1, wherein the DC input voltage is 12V, 9V, or 5V, and the predetermined DC voltage is 5V.

10. A DC power converting method, for generating a predetermined DC voltage, comprising:
providing a direct current (DC) power converting circuit, comprising
a DC input end, for receiving a DC input voltage;
a DC output end, for providing the predetermined DC voltage;
a switch, coupled between the DC input end and the DC output end, for providing a direct path, wherein the switch is an FET having a source coupled to the DC input end and a drain coupled to the DC output end via an inductor;
a DC-DC step-down unit, coupled between the DC input end and the DC output end, for providing a step-down voltage path, wherein the DC-DC step-down unit is a DC-DC step-down integrated circuit controlled by a logic level voltage and the DC-DC step-down circuit has a DC-DC step-down circuit input end coupled to the DC input end and a DC-DC step-down circuit output end coupled to the DC output end; and
a control unit, coupled to the switch and the DC-DC step-down unit, for detecting the DC input voltage to select either the direct path or the step-down voltage path for in order to providing the predetermined DC voltage to the DC output end, wherein the control unit comprises:
a sampling circuit, coupled to the DC input end, for obtaining a sampled signal of the DC input voltage, wherein the sampling circuit comprises:
a first sampling circuit comprising a first resistor and a second resistor; and
a second sampling circuit comprising a third resistor and a fourth resistor;
wherein the first resistor and the second resistor are coupled in series between the DC input end and round and the third resistor and the fourth resistor are coupled in series between the DC output end and ground;
a comparing circuit, coupled to the sampling circuit, for receiving the sampled signal and comparing the sampled signal with a reference voltage to generate a comparison result, wherein the comparing circuit comprises:
a first comparing circuit comprising a fifth resistor and a first NPN transistor; and
a second comparing circuit comprising a PNP transistor;
wherein the first NPN transistor has a first base, a first collector, and a first emitter, the first base is coupled between the first resistor and the second resistor, the first collector is coupled to the DC input end via the fifth resistor, and the first emitter is coupled to ground;
a control signal generating circuit, coupled to the comparing circuit, for generating a control signal for controlling the switch and the DC-DC step-down unit simultaneously, wherein the control signal generating circuit comprises:
a first control signal generating circuit comprising a sixth resistor a seventh resistor, a first capacitor and a second NPN transistor; and
a second control signal generating circuit comprising the PNP transistor and an eighth resistor;
wherein the second NPN transistor has a second base, a second collector, and a second emitter, the second base is coupled to the first collector of the first NPN transistor via the fifth resistor and is also coupled to ground via the first capacitor, the second emitter is coupled to ground, and the second collector is coupled to the gate of the FET and is also coupled to the DC input end via the sixth resistor;
wherein the PNP transistor has a third base, a third collector, and a third emitter, the third base is coupled between the third resistor and the fourth resistor, the third emitter is coupled to the DC output end, the third collector is coupled to a control signal input pin of the DC-DC step-down unit via the eighth resistor;
wherein when DC input voltage is greater than an upper limit of a predetermined operating voltage range, the control unit triggers the switch to open and enables the DC-DC step-down unit to select the step-down voltage path; and when the DC input voltage is within the predetermined operating voltage range, the control unit triggers the switch to close and disables the DC-DC step-down unit to select the direct path;
receiving a DC input voltage;
detecting the DC input voltage;
comparing the DC input voltage with a predetermined operating voltage range;
adjusting the DC input voltage to the predetermined DC voltage for outputting when the DC input voltage exceeds the predetermined operating voltage range; and
directly outputting the DC input voltage when the DC input voltage is within the predetermined operating voltage range.

11. The DC power converting method as claimed in claim 10, wherein when the DC input voltage is 12V, 9V, or 5V, and the predetermined DC voltage is 5V.

12. The DC power converting method as claimed in claim 10, wherein the step of detecting the DC input voltage is to divide the DC input voltage to generate a sampled signal.

13. The DC power converting method as claimed in claim 12, wherein the step of comparing the DC input voltage with the predetermined operating voltage range further comprises:
comparing the sampled signal with a reference voltage to generate a comparison result; and
generating a first control signal and a second control signal according to the comparison result.

14. The DC power converting method as claimed in claim 13, wherein when the first control signal enables outputting the DC input voltage directly, the second control signal disables adjusting the DC input voltage; and when the first control signal disables outputting the DC input voltage directly, the second control signal enables adjusting the DC input voltage to the predetermined DC voltage.

* * * * *